United States Patent
Michail et al.

(10) Patent No.: US 8,510,753 B2
(45) Date of Patent: Aug. 13, 2013

(54) UNTRUSTED COMPONENT HOSTING

(75) Inventors: Ashraf A. Michail, Redmond, WA (US);
Akhilesh Kaza, Sammamish, WA (US);
Kevin T. Gallo, Woodinville, WA (US);
Sam J. George, Kenmore, WA (US);
Joseph P. Stegman, Bellevue, WA (US);
Michael R. Harsh, Redmond, WA (US);
Mark Alcazar, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 991 days.

(21) Appl. No.: 12/147,482

(22) Filed: Jun. 27, 2008

(65) Prior Publication Data

US 2009/0328066 A1   Dec. 31, 2009

(51) Int. Cl.
*G06F 9/44* (2006.01)

(52) U.S. Cl.
USPC ............ 719/316; 719/313; 726/2; 718/1

(58) Field of Classification Search
None
See application file for complete search history.

(56) References Cited

U.S. PATENT DOCUMENTS

| | | | |
|---|---|---|---|
| 6,275,938 B1 * | 8/2001 | Bond et al. | 726/23 |
| 6,308,275 B1 * | 10/2001 | Vaswani et al. | 726/2 |
| 6,522,343 B2 | 2/2003 | Sobeski et al. | |
| 6,643,657 B1 * | 11/2003 | Baird et al. | 1/1 |
| 6,820,249 B1 | 11/2004 | Jachmann et al. | |
| 6,996,832 B2 | 2/2006 | Gunduc et al. | |
| 2001/0013043 A1 * | 8/2001 | Wagner | 707/511 |
| 2004/0039846 A1 * | 2/2004 | Goss et al. | 709/248 |
| 2005/0108033 A1 | 5/2005 | Everett-Church | |
| 2006/0253584 A1 * | 11/2006 | Dixon et al. | 709/225 |
| 2007/0162752 A1 | 7/2007 | Baliga et al. | |
| 2008/0071796 A1 | 3/2008 | Ghuneim et al. | |

FOREIGN PATENT DOCUMENTS

WO   0233533 A1   4/2002

OTHER PUBLICATIONS

Goyal, Vikas., "Silverlight: A 360 Degrees Overview", "Microsoft.net Technology Blog", retrieved at <<http://dotnetwithme.blogspot.com/2007/06/silverlight-360-degree-overview.html>>, Apr. 2, 2008, pp. 1-5.

"Sun microsystems", "Sun and Microsoft Showcase Interoperability between the Java Platform and Net Framework at the 2006 JavaOne Conference", retrieved at <<http://www.sun.com/smi/Press/sunflash/2006-05/sunflash.20060516.5.xml>>, Apr. 2, 2008, pp. 1-2.

"GridShib Project Summary Report", retrieved at <<http://gridshib.globus.org/reports/project-report-20051206.html>>, Apr. 2, 2008, pp. 1-9.

"ip.com", "Reusable Object Oriented Framework for Plug Compatible Applications", retrieved at <<http://www.priorartdatabase.com/IPCOM/000115192/>>, Apr. 2, 2008, pp. 1-2.

(Continued)

*Primary Examiner* — H S Sough
*Assistant Examiner* — Umut Onat
(74) *Attorney, Agent, or Firm* — Microsoft Corporation (57) ABSTRACT

In a computing environment, one may wish to have interoperability between trusted and untrusted controls/plug-ins allowing for richer expression of content and control within a platform. This can be accomplished by allowing an untrusted plug-in to communicate with a trusted plug-in, while having the trusted plug-in exercise control over the platform. This allows for the creation of a layered secure approach of communication with a platform, thus allowing for increased application richness in untrusted third party applications.

20 Claims, 10 Drawing Sheets

(56) References Cited

OTHER PUBLICATIONS

Wu, et al., "PBJIM: Plugin-Based Job Interoperation Mechanism for Heterogeneous Grid Systems", The Sixth International Conference on Grid and Cooperative Computing, 2007, retrieved at <<http://ieeexplore.ieee.org/iel/4293746/4293747/04293868.pdf>>, Aug. 16-18, 2007, pp. 1-8.

* cited by examiner

UNTRUSTED COMPONENT HOSTING

BACKGROUND

Controls and plug-ins (components) may operate in a browser or other various software platforms, allowing for the ease of add-on functionality without adding additional source code to a secure program. These components are common within a browser environment when accessing the Internet. They provide a level of security but at a cost of limiting functionality and overall user experience.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In computing environments, controls and plug-ins are software applications that interact with a host application platform and user interface (UI) to provide extended use in the form of a specific function or action on demand. The benefits of this architecture may including allowing third-party developers to extend additional functionality, supporting future additions, and separating source code from applications.

Some models of operation may impose significant limitations on such plug-ins in order to promote platform security. For example, vendors that wish to provide components that interoperate within a software environment in a secure manner may overlay their respective applications (e.g., with no combined functionality between applications.) Furthermore, the software environment might not provide a communications pipeline between controls/plug-ins that are directed to the platform on which the software applications are contained without any interoperation therebetween. This architecture may have limitations with respect to the level of interoperability that can be achieved without incurring unwanted security risks to the computing environment or platform.

In one example, a platform hosting a component (control/plug-in) could be a standard browser for the Internet in which the component could be instantiated through scripting language when providing an enriched user experience within the browser. The browser provides the component limited access to resources (memory, video rendering space, user input, and etc.) within the confines of the browser application (e.g., providing generalized security to the application and platform). The instantiation of more than one component within the browser is possible but the communication between the one or more components is not possible. The limiting nature (e.g., "sandbox" nature) of the browser runtime environment makes access to many hardware resources, the lower software framework, and networking capabilities contained within a computing device are inaccessible. While this restricted nature of the browser provides a level of security, it also creates a level of inoperability.

In view of these considerations, a security hierarchy may be devised that allows for the interoperability between various untrusted and trusted components with the platform such that extended use of a computing devices resources can be exhibited without submitting the device to undue security risks. A software framework and environment may be devised such that the access to a secure computing device platform for an untrusted device is created through a communication channel with a secure device that brokers a relationship with a secure platform. In essence, essentially moving the computing device's resources up one hierarchy level of security and moving the untrusted device one level away, and allowing the handshaking to form a secure channel allows for the interoperability sought for in this method and system.

As provided herein, one or more methods and systems are disclosed that allow for interoperability of components wherein a platform is defined and/or a trusted component (e.g., a security layer) is utilized. An untrusted component (e.g., an unsecure layer) creates a bond with the trusted component, and the trusted component determines which platform the untrusted component is more suited to operate with (e.g. according to prerequisite conditions of the platform). It will be appreciated that where a trusted component determines that no platform is suited for the untrusted component, the trusted component may reject the untrusted component. Once the trusted component chooses a platform for the untrusted component, the untrusted component utilizes the secure communication channel (e.g., already established) between the trusted component and the platform. Through this bond, the untrusted component may perform an extended set of operations, such as manipulation of the computing system's object hierarchy, video rendering using hardware acceleration, manipulation of the network stack, more efficient use of hardware resources, and the specificity of the platform with respect to the device its operating on. This promotes an increased user experience across the platform and maintains a higher level of security. In one instance, with the instantiation of an untrusted component, such as when a user visits a webpage, a reference to the trusted component is made and the trusted component instantiates with the reference to the untrusted component and the platform. The first layer of the trusted component is drawn, and then the proceeding layers of either the trusted and untrusted components are drawn with the final result allowing for the overlapping and transparency of one layer over the other. The benefits of this include maintain the functionality of user input of either layered item without loosing interactive of one plug-in layer over the other and increasing user experience through the use of hardware acceleration, not previously possible.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A component (control/plug-in) is a computer program that interacts with a platform (e.g., a host application) to provide added functionality. The platform is a contained environment in which components are restricted to. The platform typically provides a set of resources to a component that are tightly controlled. For example, a platform may be a virtual machine or a scripting language interpreter that provides a hosting environment for the component. Applications may support the addition of these components for many reasons. For example, many applications have limitations when first developed that can later be extended to increase the functionality of the application. Often times, third-party developers create these extended functionalities. Sometimes, components may be added to the application without undue change to the base application. This practice may, for example, save time and money when considering the quality analysis aspect of the application and the overall maintenance of an unadulterated source code for the platform. In another instance, components may be added on an ad hoc basis, such as when browsing the Internet or other related communication networks. This model of operation (e.g., the component model) allows for a more streamlined footprint of a platform for the majority of end users by creating a dynamic platform capable of being custom fit (e.g., through the use of various components that change the operational functionality of the platform) to the end user's preferences. Also, legal issues could arise as to the boundaries of operation that an application can operate in without unduly treading on the property of another licensed application. It is preferable to have a modular functionality to provide for restrictive intellectual property boundaries to address these legal issues.

The component model provides modular functionality which may include email decoding keys, security keys in browsers, video encoders and decoders, video, interactive rendering in the browser, browser applications, and software upgrades, etc. With the addition of these components, the user experience (UX) becomes extended and personalized as a function of the components available and/or selected.

An elevated degree of security is employed by defining clear boundaries between components and the platform that hosts the components. This restricts the problems manifested within the components to the platform, such that they do not interfere with an operating system environment hosting the platform.

Under the current model of component security, a component cannot reach out to access other advanced secured system resources that are used by other components that are running in the operating system environment. This is a major limitation in the ability of a component during utilization. For example, video hardware acceleration is unavailable to components that run in many platforms, such as GDI, Quartz, DirectX, OpenGL, and a web browser. This limits the UX by not allowing advance 3-D video techniques, video rendering using graphical processor interfacing components, and other hardware/software support which is highly desired in the platform. Additionally, components operating on the same platform are unable to communicate, causing them to operate with complete unawareness of one another. Thus when a pointing device's focus is directed towards the UI of a component, the component comes to the focus of the pointing device with complete disregard and unawareness of the other components. The current model takes several approaches to expand a components' functionality and strengthen the relationship of the component with the platform. In one approach, the component increased access to the resources of the operating system environment through the platform. One drawback of this approach is the increased security risks associated with this access. Another approach is to allow the component to add additional code directly to the base code of the platform and go through a recompilation process. The drawback of this approach is that it causes instability in the operating system environment, and the new code may interact poorly with other lines of code or components added later.

In contrast to the aforementioned approaches, the technique provided herein involves the abstraction of the security hierarchy of the component model one level. A relationship is brokered between an untrusted component, and a trusted component which acts as the intercessor between an untrusted component and the platform hosting the components. The trusted component matches the untrusted component with the platform suitable for the untrusted component as a function of specifications and/or limitations of the platform and/or untrusted component. Once the untrusted component and the platform have been matched up, the trusted component acts as an intermediary, providing a secure means for running the untrusted component on the platform. By doing this, system resources, contained in the operating system environment, are further away from the untrusted component that is hosted in the platform. Said another way, the trusted component takes on the security role of the platform in the model, thus allowing for expanded implementation of the untrusted component.

Figure 1:
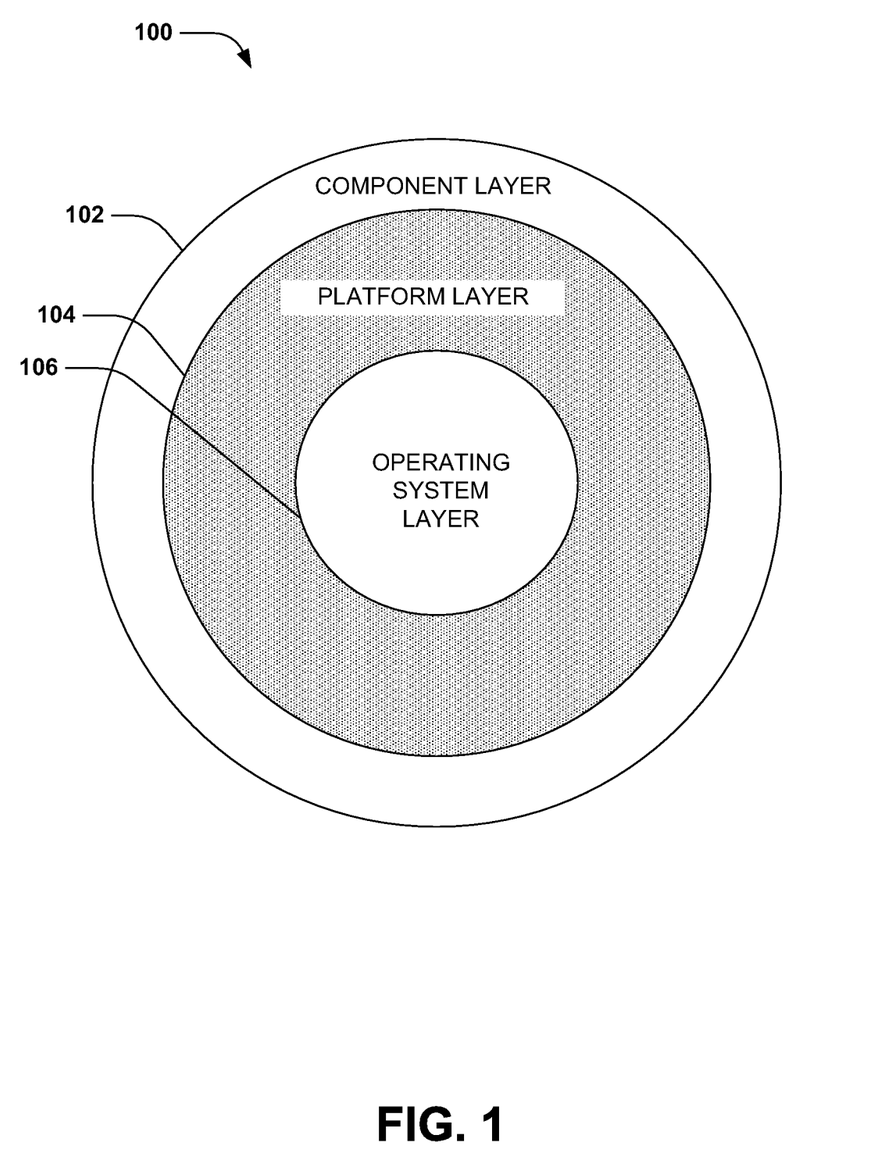
FIG. 1 is an illustration of a security hierarchy model of components on a platform for the basic component, platform relationship.

FIG. 1 is an illustration of a security hierarchy model 100. This model comprises a component layer 102, a platform layer 104 and an operating system layer 106. In one example, the component layer 102 could comprise a component add-on to a web browser in the platform layer 104. All components have the same level of access and are restricted according to access of hardware/software resources and communications channels (e.g., under this model there is no distinction between an untrusted or trusted component). The component layer 102 does not have the ability to render advanced graphics through hardware/software acceleration of the operating system layer 106 by means of the platform layer 104. This is a significant limitation of the security hierarchy model 100.

To grant the component layer 102 access to resources found in platform layer 104 without shielding the platform layer 104 from the component exposes the operating system layer 106 (e.g., and the computing device) to potential security issues. Stated another way, if there was no platform layer 104, there would be no boundaries to limit the component's could operation (e.g., it could significantly interfere with the operating system's resources). Hence, the structure of the security hierarchy model 100 is maintained at its minimal level of operation to limit the component's operations, as illustrated in security hierarchy model 100.

Figure 2:
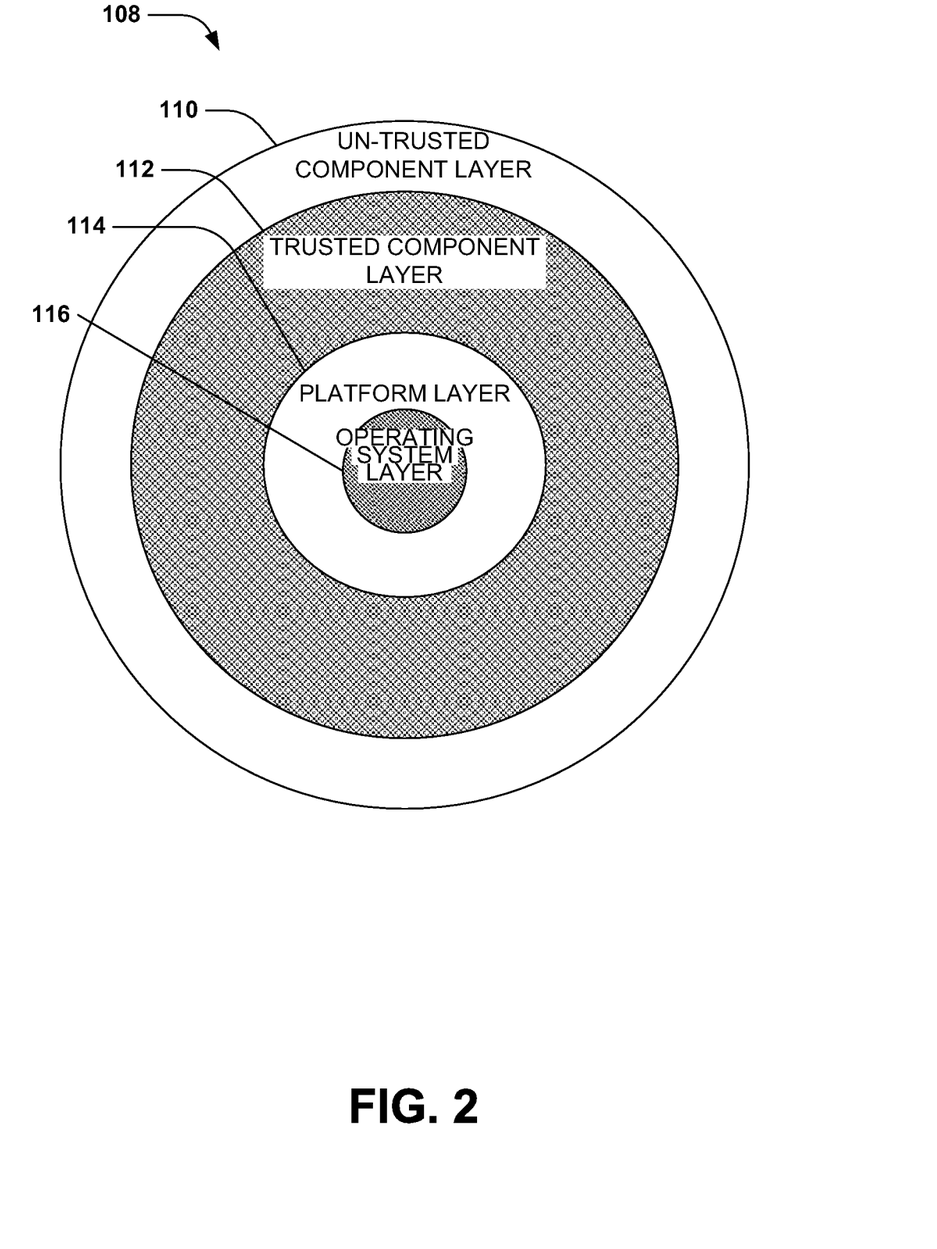
FIG. 2 is an illustration of an exemplary security hierarchy model for untrusted and trusted components on a platform, allowing increased operability.

FIG. 2 is an illustration of an exemplary security hierarchy model 108 with the implementation of an untrusted component layer 110, trusted component layer 112, platform layer 114, and operating system layer 116. The exemplary security hierarchy model 108 provides increased interoperability between the various untrusted components within the untrusted component layer 110 by utilizing the trusted component layer 112. When privileged requests for resources are made to the platform by untrusted components, the untrusted component communicates with the trusted component, instead of communicating directly with the platform. This allows for advanced functionality of the untrusted components with an additional buffer in the form of the trusted component between the platform layer 114 and the untrusted component layer 110.

Figure 3:
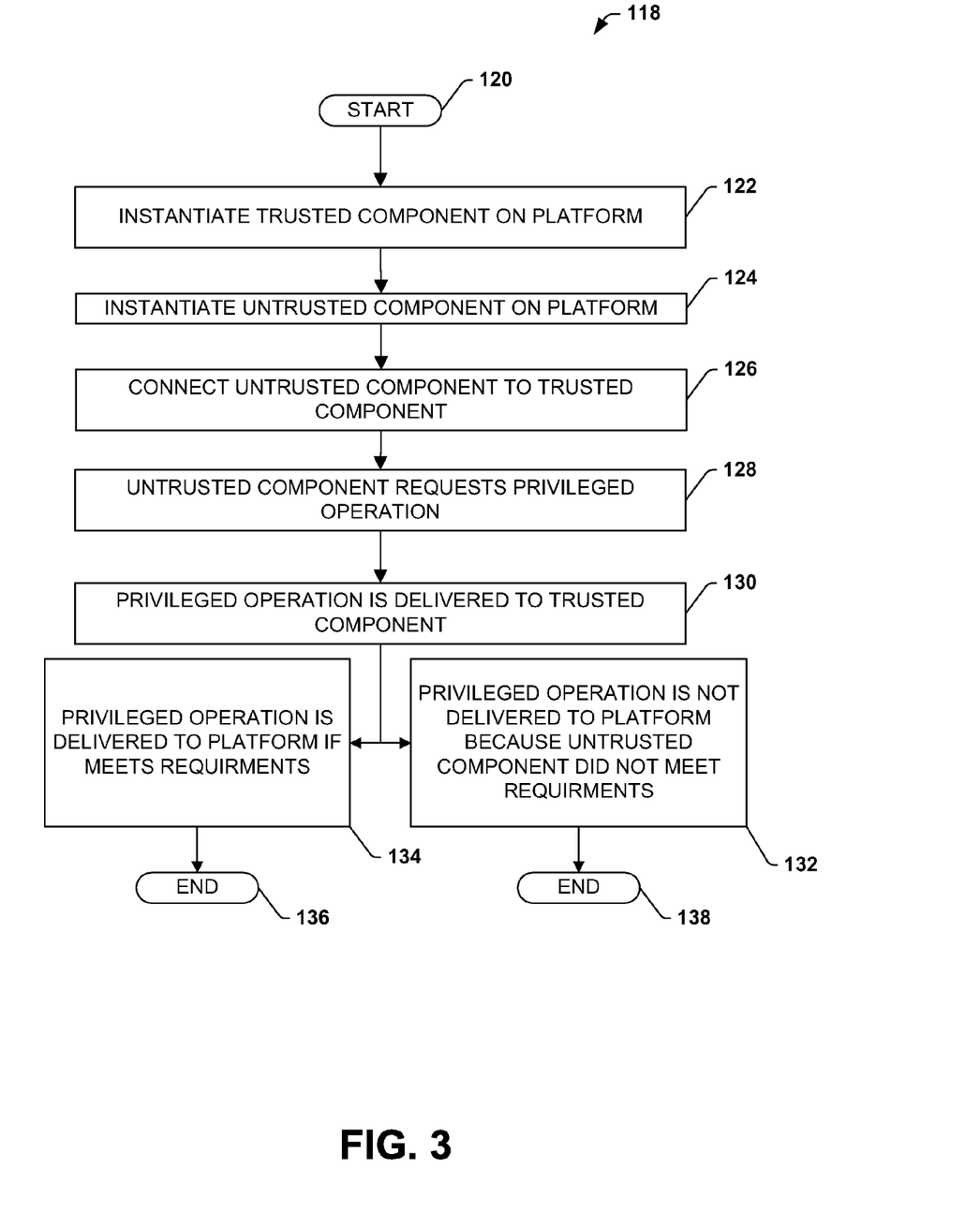
FIG. 3 is a flow diagram illustrating an exemplary method of the untrusted/trusted privileged operation request to the platform.

FIG. 3 illustrates exemplary methodology 118 for hosting an untrusted component in a platform comprising one or more trusted components. The method begins at 120, and at 122, a trusted component is instantiated on a platform. Once the trusted component is instantiated, the untrusted component is instantiated on the platform at 124. With the untrusted and trusted component being hosted on the platform, the untrusted component connects to the trusted component at 126 and creates a secure communication channel between the two components. After the connection of the untrusted component to the trusted component, the untrusted component requests a privileged operation at 128. The privileged operation is delivered to the trusted component at 130 through the connection made to the trusted component at 126. Depending on the restrictions set by the trusted component, the privileged operation is either delivered to the platform at 134 or not delivered to the platform at 132 because the untrusted component did not meet the standards of the trusted component. The method ends at 136 or 138 respectively.

Figure 4:
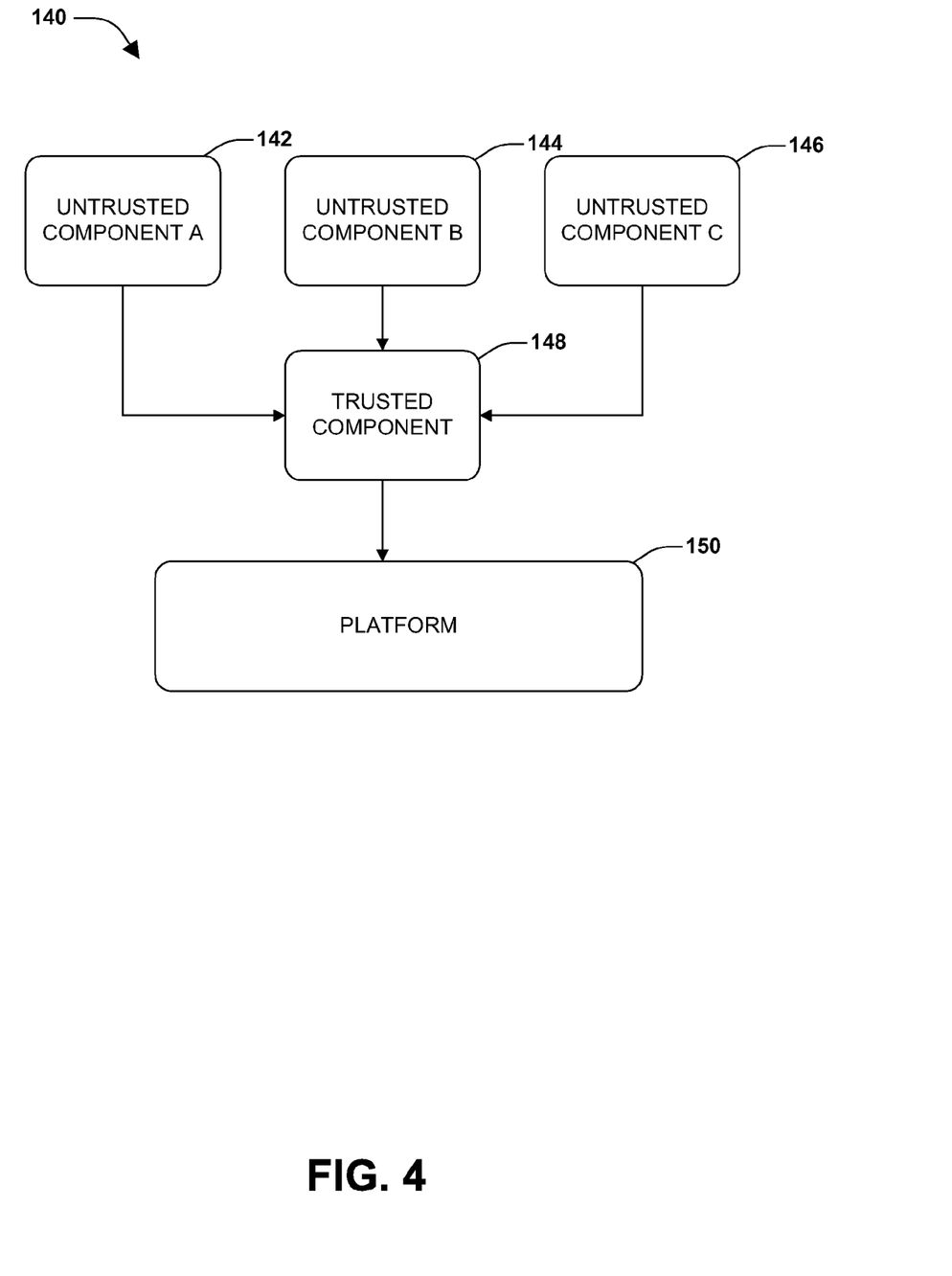
FIG. 4 is an illustration of an exemplary multiple untrusted component environment.

FIG. 4 illustrates an exemplary multiple untrusted component environment 140 using the technique disclosed herein when more than one untrusted component is communicating to a trusted component for access to the platform. Untrusted component A 142, untrusted component B 144, and untrusted component C 146 are instantiated. With the instantiation of trusted component 148, the untrusted components 142, 144, and 146 connect to a trusted component 148. Requests for privileged operations from the untrusted components 142, 144, and 146 are delivered to trusted component 148 and sent on to the platform 150 if they meet the specifications set forth.

Figure 5:
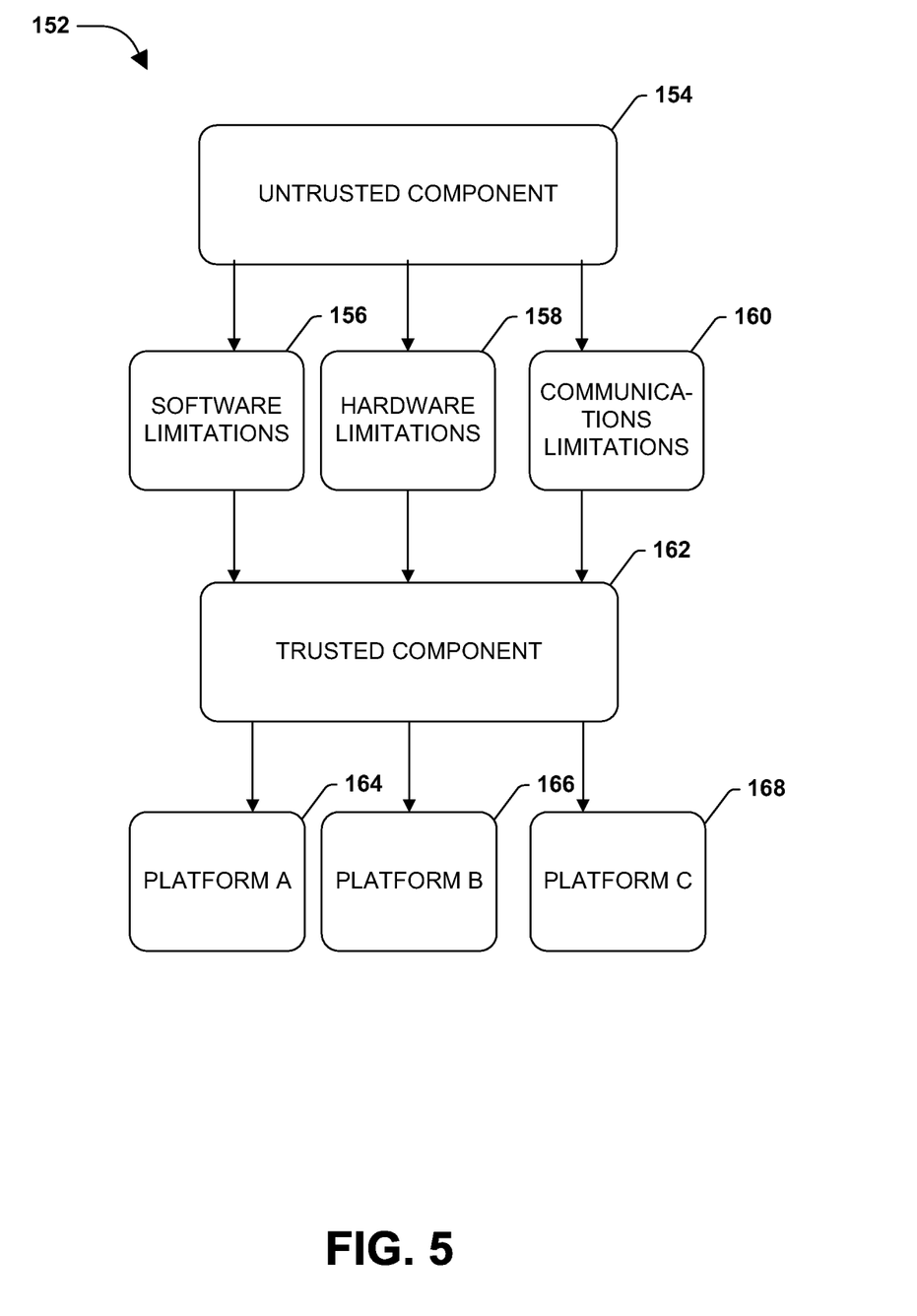
FIG. 5 is an illustration of an exemplary platform environment based on the limitations invoked by the use of the untrusted component on said platform.

FIG. 5 is an illustration of an exemplary platform environment 152 based on the limitations of the untrusted component. In the illustrated example, an untrusted component 154 exhibits limitations that are invoked by the hardware architecture, software architecture, or communications architecture on which the untrusted component might be instantiated. For example, software limitations 156 could occur through certain additional trusted components that support platform compatibility, component version, and etc. Hardware limitations 158 could occur, for example, due to the hardware architecture that the untrusted component is hosted on, limited hardware resources, and other specifics the trusted application might use to function properly. Communication limitations 160 could arise, for example, when the untrusted component is hosted over a dial-up connection, a weak wireless signal, high network activity, and other bandwidth limiting situations.

These limitations of the untrusted component 154 are passed to the trusted component 162. The trusted component 162 makes decisions as to the platform that a privileged operation is delivered to. Delivering a privileged operation to a platform that is unable to process the privileged operation is unnecessary. Therefore, the trusted component 162 delivers the privileged operation to the platform that meets the prerequisites of the untrusted component 154. For example, in the case of software limitations 156, the privileged operation might be delivered from the trusted component 162 to platform A 164 due to the predetermined interoperability between the versions of the untrusted component 154 and platform A 164, but not platform B 166 or platform C 168. In another instance, the hardware limitations 158 of the untrusted component 154, delivered to the trusted component 162, might involve the use of 3D acceleration from a specific type of graphics processing unit supported by platform B 166. Yet in another consideration, the untrusted component 154 might have communication limitations requiring network connection of no less than 1 Mb uplink/downlink. This limitation is passed on to trusted component 162 and a privileged operation is delivered to platform B 166 and platform C 168 due to their ability to fulfill the prerequisites of untrusted component 154.

When limitations of the untrusted component 154 cannot be fulfilled by available platforms, an approximation of the appropriate platform might be used to provide limited functionality to the untrusted component 154. In other instances, the limitations of the untrusted component 154 might end at the deliverance of the privileged operation to trusted component 162, because the platforms are unable to meet the prerequisites (e.g., the basic level of operation) for the untrusted component 154 to function. Nevertheless, the trusted component 162 is the intercessor for the privileged operations of the untrusted component 154.

Figure 6:
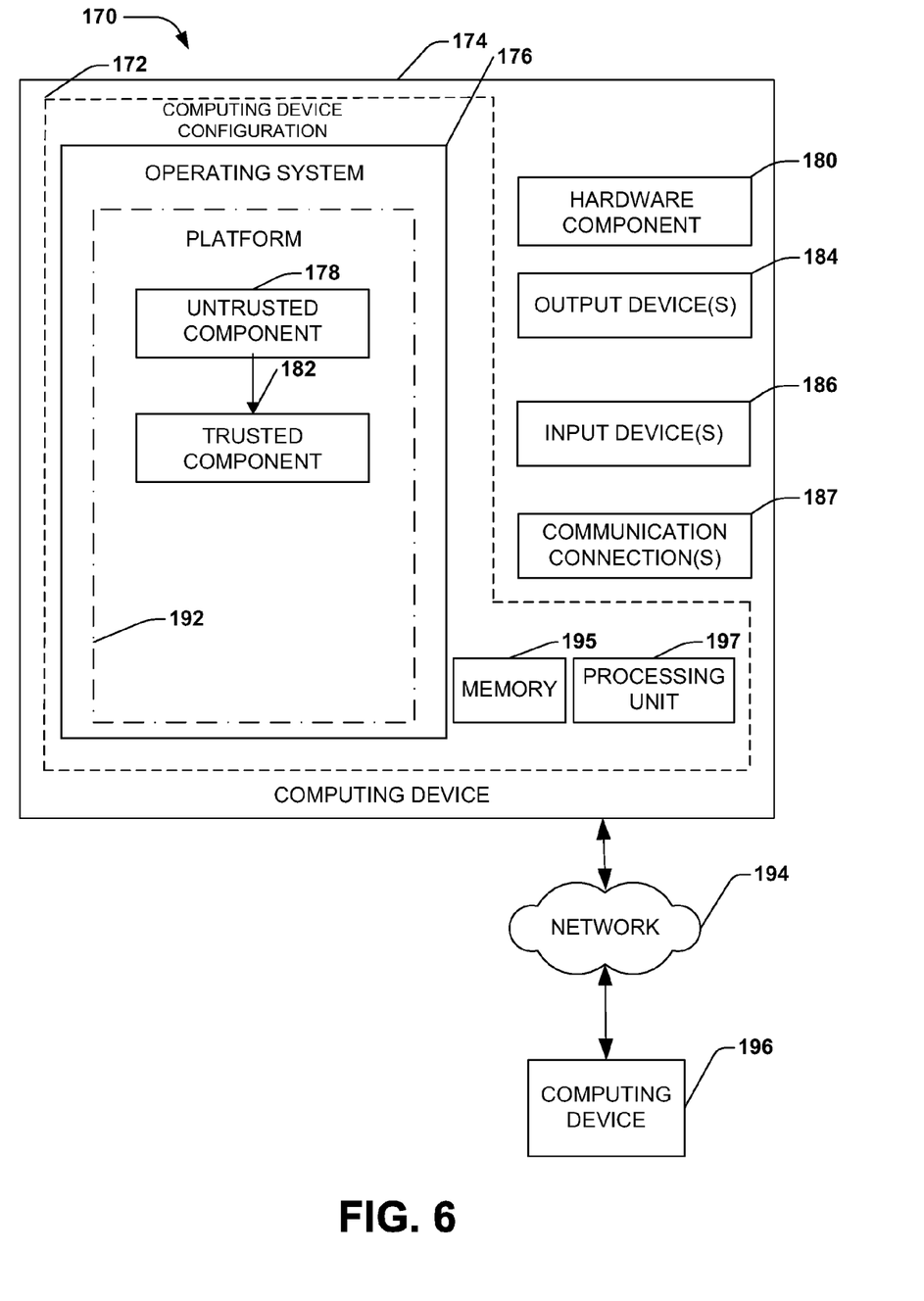
FIG. 6 is an illustration of an exemplary computing environment wherein the interoperability between untrusted and trusted components exists.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Embodiments may be described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 170 comprising a computing device 174 configured to implement one or more embodiments provided herein. In one configuration, computing device 174 includes at least one processing unit 197 and memory 195. Depending on the exact configuration and type of computing device, memory 195 may be volatile (such as RAM, for example), non-volatile (such as ROM, flash memory, etc., for example) or some combination of the two. This configuration is illustrated in FIG. 6 by dashed line 172.

In other embodiments, device 174 may include additional features and/or functionality. For example, device 174 may also include additional storage (e.g., removable and/or non-removable) including, but not limited to, magnetic storage, optical storage, and the like. Such additional storage is illustrated in FIG. 6 by hardware component 180. In one embodiment, computer readable instructions to implement one or more embodiments provided herein may be in hardware component 180. Hardware component 180 may also store other computer readable instructions to implement an operating system, an application program, and the like. Computer readable instructions may be loaded in memory 195 for execution by processing unit 197, for example.

The term "computer readable media" as used herein includes computer storage media. Computer storage media includes volatile and nonvolatile, removable and non-removable media implemented in any method or technology for storage of information such as computer readable instructions or other data. Memory 195 and storage hardware component 180 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 174. Any such computer storage media may be part of device 174.

Device 174 may also include communication connection(s) 187 that allows device 174 to communicate with other devices. Communication connection(s) 187 may include, but is not limited to, a modem, a Network Interface Card (NIC), an integrated network interface, a radio frequency transmitter/receiver, an infrared port, a USB connection, or other interfaces for connecting computing device 174 to other computing devices. Communication connection(s) 187 may include a wired connection or a wireless connection. Communication connection(s) 187 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 174 may include input device(s) 186 such as keyboard, mouse, pen, voice input device, touch input device, infrared cameras, video input devices, and/or any other input device. Output device(s) 184 such as one or more displays, speakers, printers, and/or any other output device may also be included in device 174. Input device(s) 186 and output device(s) 184 may be connected to device 174 via a wired connection, wireless connection, or any combination thereof.

In one embodiment, an input device or an output device from another computing device may be used as input device(s) 186 or output device(s) 184 for computing device 174.

Components of computing device 174 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 174 may be interconnected by a network. For example, memory 195 may be comprised of multiple physical memory units located in different physical locations interconnected by a network.

Those skilled in the art will realize that storage devices utilized to store computer readable instructions may be distributed across a network. For example, a computing device 196 accessible via network 194 may store computer readable instructions to implement one or more embodiments provided herein. Computing device 174 may access computing device 196 and download a part or all of the computer readable instructions for execution. Alternatively, computing device 174 may download pieces of the computer readable instructions, or some instructions may be executed at computing device 174 and some at computing device 196.

The operating system 176 of computing device 174 can be one of many operating systems that are available for computing devices. Contained within the operating system 176 is the platform 192. The platform 192 can be many environments, for example, a brower, virtual machine, and etc. Contained within the platform 192 lie the untrusted component 178 and trusted component 182. The secure communication between the untrusted component 178 and the trusted component 182 occur inside the platform 192.

Figure 7:
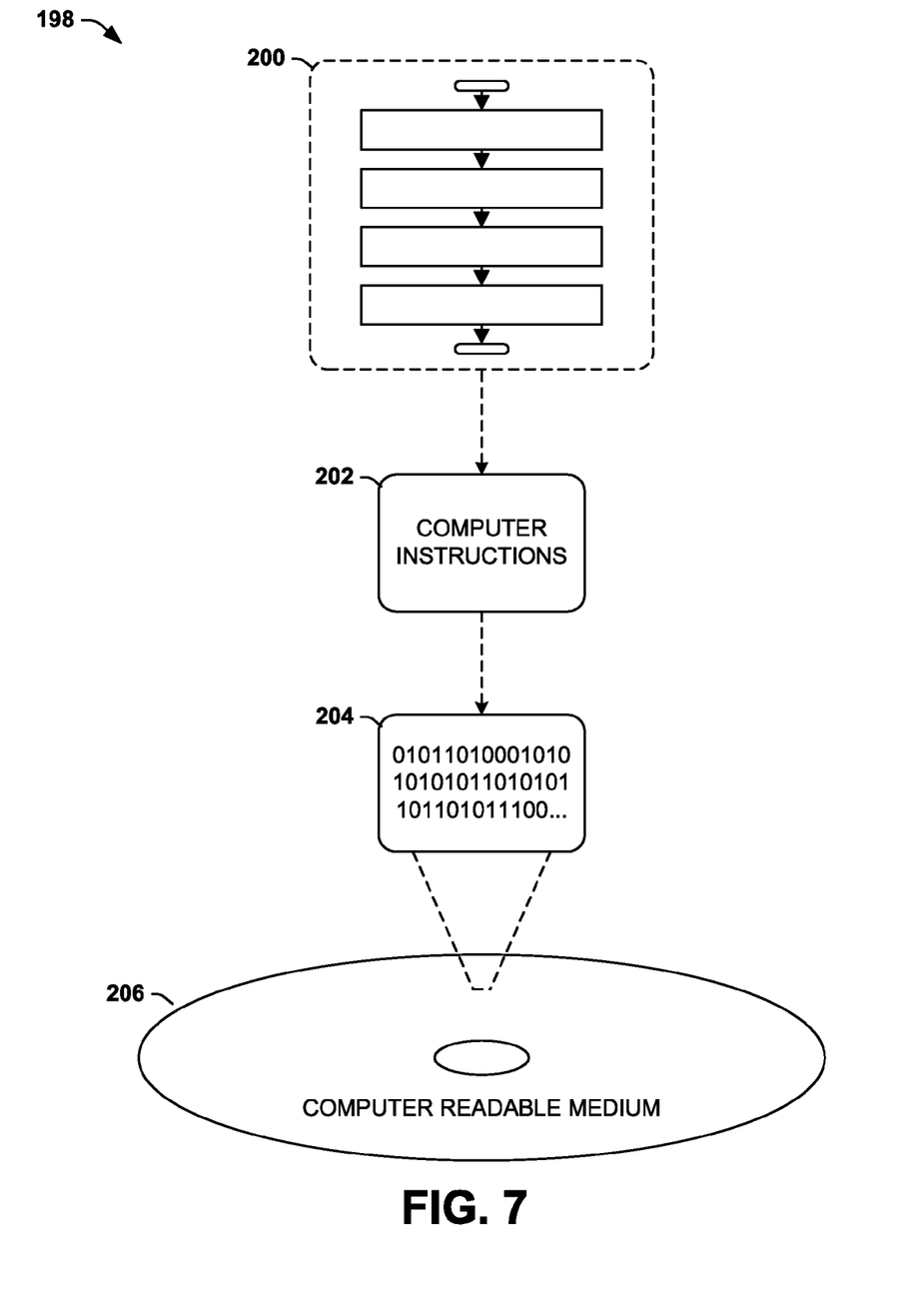
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 198 comprises a computer-readable medium 206 (e.g., a CD-R, DVD-R, or a platter of a hard disk drive), on which is encoded computer-readable data 204. This computer-readable data 204 in turn comprises a set of computer instructions 202 configured to operate according to one or more of the principles set forth herein. In one such embodiment 200, the processor-executable instructions 202 may be configured to perform a method, such as the exemplary method 118 of FIG. 3, for example. In another such embodiment, the processor-executable instructions may be configured to implement a system, such as the exemplary platform environment 152 of FIG. 5, for example. Many such computer-readable media may be devised by those of ordinary skill in the art that are configured to operate in accordance with the techniques presented herein.

Figure 8:
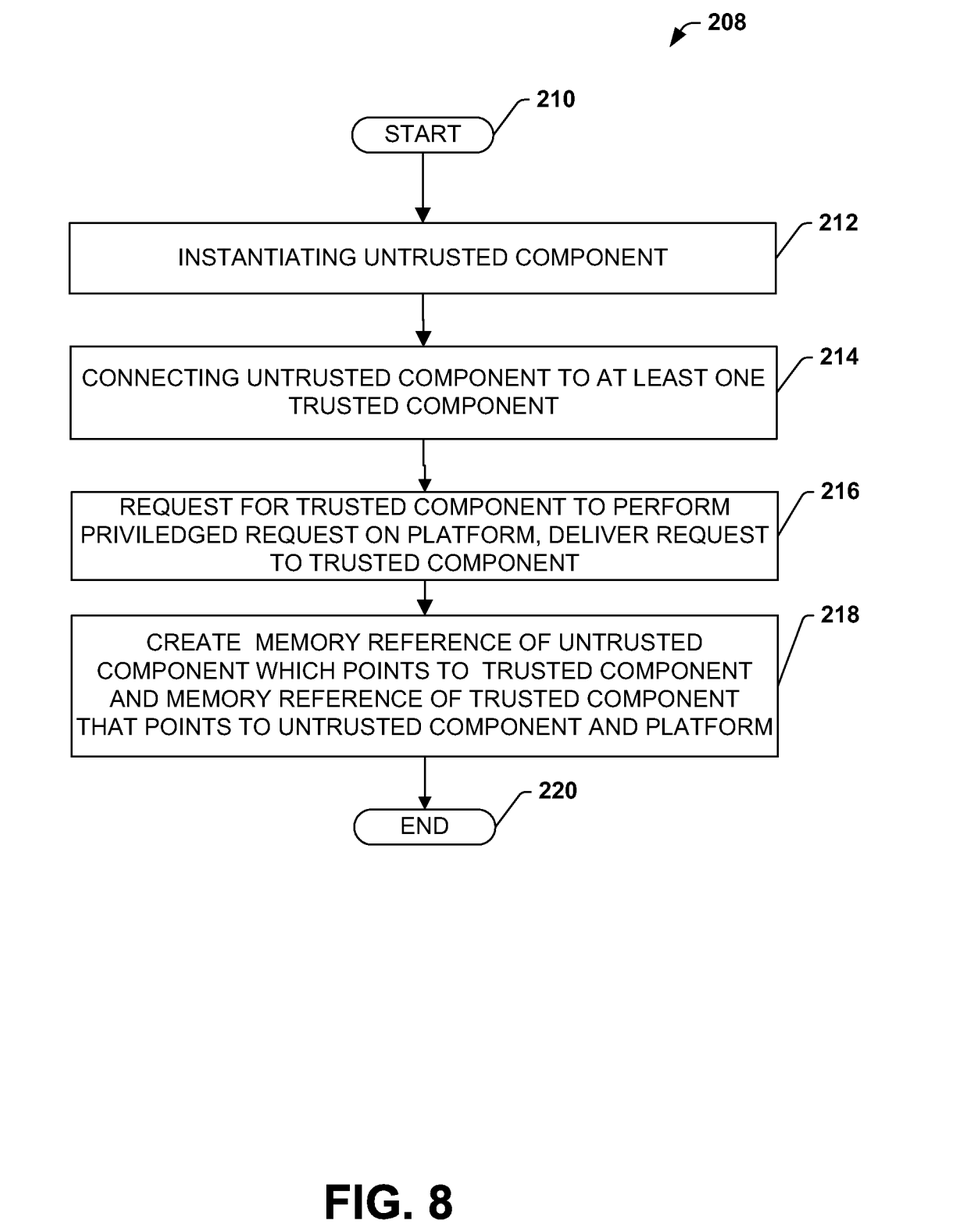
FIG. 8 is an illustration of an exemplary method of receiving the untrusted component, trusted component, and the untrusted component requesting a privileged operation of the trusted component.

FIG. 8 is an illustration of an exemplary method 208 of hosting an untrusted component in a platform comprising one or more trusted components. At 210, the method starts. At 212 the untrusted component is instantiated. The untrusted component is connected to at least one trusted component at 214. At 216, an untrusted component's request to perform a privileged operation on the platform is received by the trusted component. A memory reference of the untrusted component that references the trusted component and a memory reference of the trusted component that points to the untrusted component and platform are created at 218. The method ends at 220. This exemplary method 208 outlines the procedure in which the security hierarchy system and method are operated.

Figure 9:
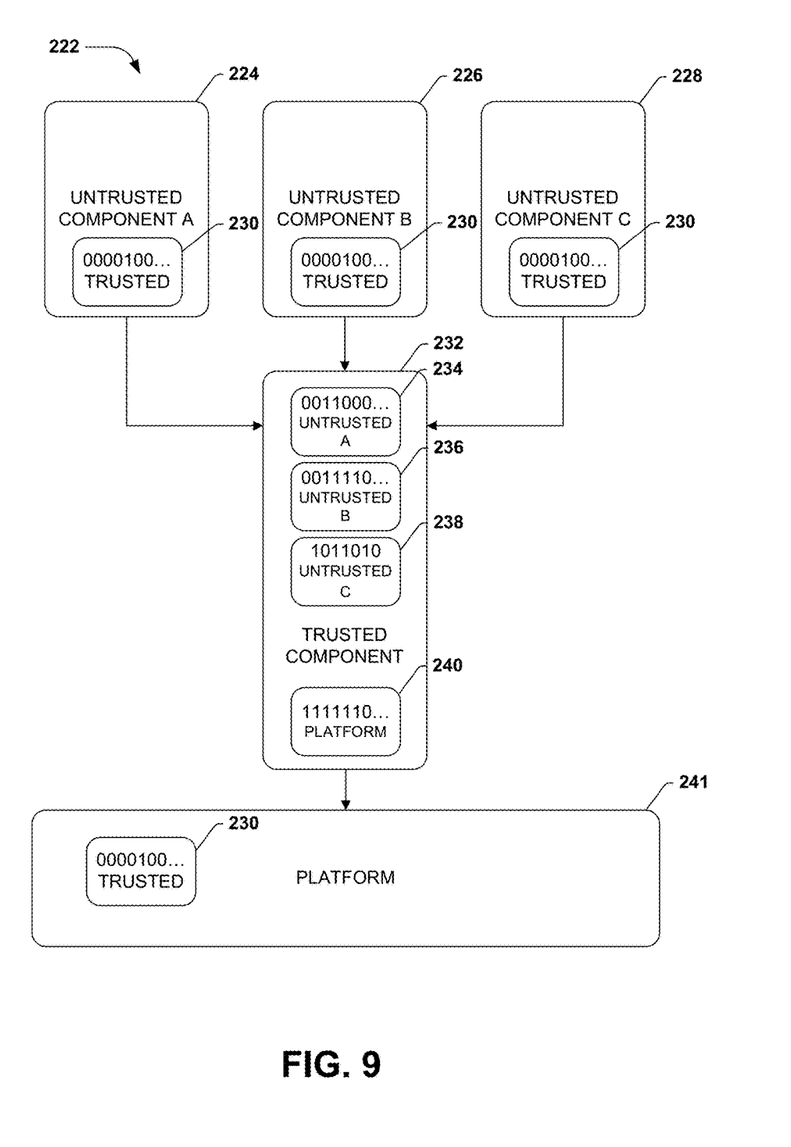
FIG. 9 is a component block diagram illustrating an exemplary system of use of memory reference pointers between untrusted, trusted and platform components.

FIG. 9 is a component block diagram illustrating an exemplary system 222 that uses memory reference pointers between untrusted, trusted and platform components to form the secure communications channel. Illustrated are untrusted component A 224, untrusted component B 226 and untrusted component C 228 with trusted memory reference 230 pointing to trusted component 232. Trusted component 232 comprises untrusted memory reference A 234, untrusted memory reference B 236, and untrusted memory reference C 238 along with a platform memory reference 240. Platform component 241 has trusted memory reference 230. The memory references illustrated in exemplary system 222 allow for the secure communication between the untrusted components and trusted components, and from the trusted component to the platform.

Figure 10:
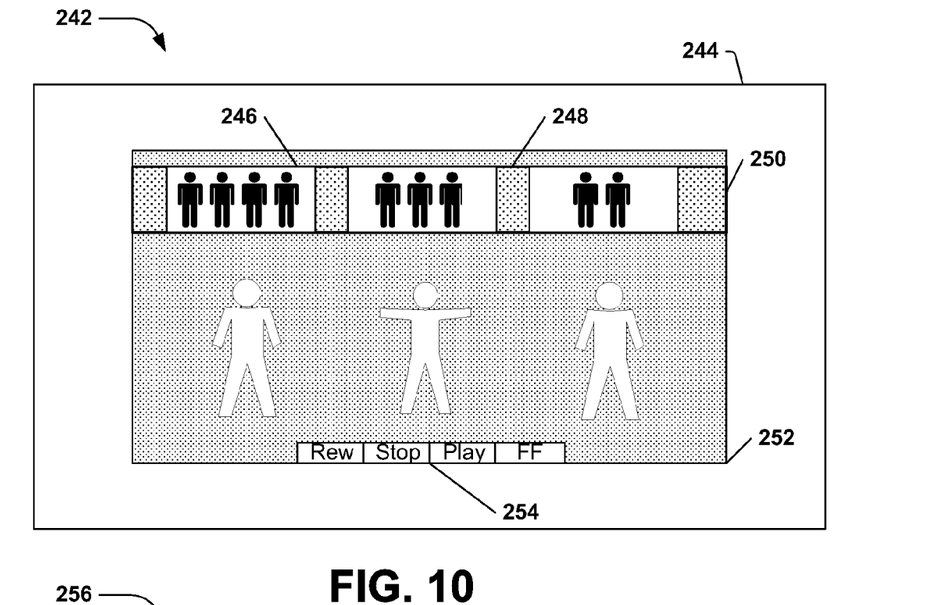
FIG. 10 is an illustration of an exemplary interaction of an untrusted and trusted component wherein, the untrusted and trusted component exhibit layering of the prospective components within a user interface.

FIG. 10 is an illustration of an exemplary example 242 of an untrusted and trusted component wherein, the untrusted and trusted component exhibit layering of the prospective components within a graphical user interface. Trusted component 244 surrounds the instantiation of an untrusted video component 252 with additional layering characteristics displayed by a trusted menu bar 250. Additional untrusted frames 246 are layered within the trusted menu bar 250. Another feature is the trusted inherent transparency 248 of trusted menu bar 250 included in the trusted component that allows the untrusted video component 252 to be displayed in areas of the trusted menu bar 250 that do not contain untrusted frames 246. An additional trusted control menu bar 254 is illustrated, allowing for user input in the form of a selection input that controls the untrusted content along with trusted content. This illustrates the redirection process that is enabled by the communication between the untrusted video component 252 with trusted component 244 and trusted control menu bar 254. With these features, untrusted video component 252 can draw at is own draw frequency within the trusted component 244. The trusted component also has the ability to access other cross platform API's, hardware resources, and communications resources, for example.

Figure 11:
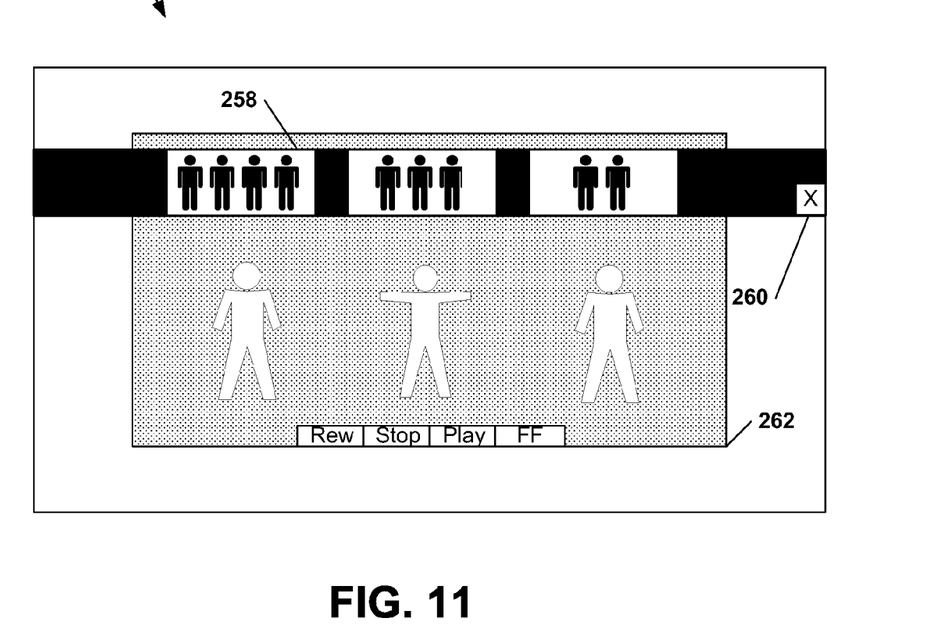
FIG. 11 is an illustration of an exemplary interaction of an untrusted and trusted component wherein, the untrusted and trusted component exhibit layering, specifically the trusted component now extends past the boundaries of the always-on-top untrusted component.

FIG. 11 is an illustration of an exemplary example 256 of an untrusted always-on-top video component 262 and trusted menu bar component 258, wherein the trusted component exhibits layering. Specifically the trusted component now extends past the boundaries of an untrusted always-on-top video component 262, in effect providing layering of trusted and untrusted components. With the layering of components, the trusted menu bar button 260 and the trusted menu bar component 258 remain interactive when layered over the untrusted always-on-top video component 262. Allowed also is the redirecting of user input when the focus of the input is on the untrusted or trusted component, thus allowing the untrusted and trusted components to communicate over a secure communication channel created by the pointers of exemplary system 222 of FIG. 9.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of hosting an untrusted component, comprising:
   establishing a communication channel between the untrusted component and a trusted component in operable communication with a plurality of platforms;
   receiving a request at the trusted component from the untrusted component, the request comprising information indicative of an intent to be processed via at least one platform of the plurality of platforms;
   determining, at the trusted component, to process the request via a first platform of the plurality of platforms based upon the information comprised in the request, the request not originating from the first platform and the first platform comprising at least one of a virtual machine or a scripting language interpreter, the determining comprising:
      determining that the first platform satisfies a first number of conditions of the untrusted component;
      determining that a second platform of the plurality of platforms satisfies a second number of the conditions of the untrusted component, the second number less than the first number;
      determining that none of the plurality of platforms satisfy all of the conditions of the untrusted component; and
      determining that the first platform is to process the request when the first platform satisfies more of the conditions of the untrusted component than the second platform and no platform satisfies all of the conditions of the untrusted component, wherein the conditions of the untrusted component comprise at least one of connection type, wireless signal strength, network activity volume, graphics processing unit type or network connection speed; and
   transmitting the request to the first platform based upon the determining to process the request via the first platform.

2. The method of claim 1, the determining to process the request via the first platform comprising:
   identifying at least some of the conditions of the untrusted component based upon the information comprised in the request.

3. The method of claim 1, where the conditions of the untrusted component comprise at least one of:
   a platform size limitation;
   a hardware limitation of at least one of:
      the untrusted component, or
      at least some of the plurality of platforms; or
   a software limitation of at least one of:
      the untrusted component, or
      at least some of the plurality of platforms.

4. The method of claim 1, the information comprised in the request indicative of an intent for the request to be processed via the second platform and the determining to process the request via the first platform comprising:
   redirecting the request such that the request is processed via the first platform and not transmitted to the second platform.

5. The method of claim 1, the establishing, comprising:
   creating a memory reference for the untrusted component that references the trusted component; and
   creating a memory reference for the trusted component that references the untrusted component.

6. The method of claim 1, comprising establishing a second communication channel between a second untrusted component and the trusted component while the communication channel between the untrusted component and the trusted component is established.

7. The method of claim 6, comprising:
   receiving a second request at the trusted component from the second untrusted component;
   determining, at the trusted component, to process the second request via a different platform than the first platform; and
   transmitting the second request to the different platform.

8. The method of claim 1, the request comprising a request to render video.

9. The method of claim 1, the request comprising a request for one or more platforms of the plurality of platforms to process a privileged operation, the privileged operation operating on at least one of:
   a hardware component;
   a computing environment;
   a runtime environment;
   a graphical user interface; or
   an application framework and communications channel.

10. A system for hosting an untrusted component, comprising:
    a trusted component configured to receive a request from the untrusted component, and the trusted component configured to determine to process the request via a first platform of a plurality of platforms comprising at least one of a virtual machine or a scripting language interpreter, the trusted component configured to:
       determine that the first platform satisfies a first number of conditions of the untrusted component;
       determine that a second platform of the plurality of platforms satisfies a second number of the conditions of the untrusted component, the second number less than the first number;
       determine that none of the plurality of platforms satisfy all of the conditions of the untrusted component; and
       determine that the first platform is to process the request when the first platform satisfies more of the conditions of the untrusted component than the second platform and no platform satisfies all of the conditions of the untrusted component, wherein the conditions of the untrusted component comprise at least one of connection type, wireless signal strength, network activity volume, graphics processing unit type or network connection speed; and
    a processor configured to implement at least some of the system.

11. The system of claim 10, the request comprising information indicative of an intent for the request to be processed via the second platform of the plurality of platforms and the trusted component configured to redirect the request to the first platform.

12. The system of claim 10, the request comprising a request to render video.

13. The system of claim 10, where the conditions of the untrusted component comprise at least one of:
    a platform size limitation;
    a hardware limitation of at least one of the untrusted component, the first platform or the second platform;
    a software limitation of at least one of the untrusted component, the first platform or the second platform; or
    a communication limitation of at least one of the untrusted component, the first platform or the second platform.

14. The system of claim 10, the trusted component configured to establish a secure communication channel between the untrusted component and the trusted component.

15. The system of claim 14, the trusted component configured to filter requests made by the untrusted component through the secure communication channel.

16. The system of claim 10, the trusted component configured to be in operable communication with at least the first platform and the second platform concurrently.

17. The system of claim 10, the trusted component configured to be in operable communication with a plurality of untrusted components concurrently.

18. A computer readable storage memory comprising computer executable instructions that when executed via a processing unit perform a method, the method comprising:
- establishing a communication channel between an untrusted component and a trusted component in operable communication with a plurality of platforms;
- receiving a request at the trusted component from the untrusted component;
- determining, at the trusted component, to process the request via a first platform of the plurality of platforms, the request not originating from the first platform, the determining comprising:
  - determining that the first platform satisfies a first number of conditions of the untrusted component;
  - determining that a second platform of the plurality of platforms satisfies a second number of the conditions of the untrusted component, the second number less than the first number;
  - determining that none of the plurality of platforms satisfy all of the conditions of the untrusted component; and
  - determining that the first platform is to process the request when the first platform satisfies more of the conditions of the untrusted component than the second platform and no platform satisfies all of the conditions of the untrusted component, wherein the conditions of the untrusted component comprise at least one of connection type, wireless signal strength, network activity volume, graphics processing unit type or network connection speed; and
- transmitting the request to the first platform based upon the determining to process the request via the first platform.

19. The computer readable storage memory of claim 18, the request comprising a request to render video.

20. The computer readable storage memory of claim 18, the first platform comprising at least one of a software framework or a network framework.

* * * * *